United States Patent
Kawase et al.

(10) Patent No.: US 11,472,298 B2
(45) Date of Patent: Oct. 18, 2022

(54) VEHICLE EQUIPPED WITH HIGH PRESSURE GAS CONTAINER

(71) Applicant: HONDA MOTOR CO., LTD., Tokyo (JP)

(72) Inventors: Satoru Kawase, Wako (JP); Naoki Ogiwara, Wako (JP); Toshihiko Kanezaki, Wako (JP); Takatsugu Koyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 361 days.

(21) Appl. No.: 16/737,412

(22) Filed: Jan. 8, 2020

(65) Prior Publication Data

US 2020/0223317 A1 Jul. 16, 2020

(30) Foreign Application Priority Data

Jan. 11, 2019 (JP) .............................. JP2019-003437

(51) Int. Cl.
 *B60K 1/04* (2019.01)
 *B60L 50/71* (2019.01)
 *F17C 1/00* (2006.01)

(52) U.S. Cl.
 CPC ............... *B60L 50/71* (2019.02); *B60K 1/04* (2013.01); *F17C 1/00* (2013.01);
 (Continued)

(58) Field of Classification Search
 CPC ...... B60L 50/71; F17C 1/00; F17C 2221/012; F17C 2270/0184
 See application file for complete search history.

(56) References Cited

U.S. PATENT DOCUMENTS

| | | | |
|---|---|---|---|
| 8,037,956 B2 | 10/2011 | Noguchi et al. | |
| 2005/0093287 A1 | 5/2005 | Kondo | |

(Continued)

FOREIGN PATENT DOCUMENTS

| | | |
|---|---|---|
| JP | 2002-373687 A | 12/2002 |
| JP | 2006-240475 A | 9/2006 |

(Continued)

OTHER PUBLICATIONS

Office Action dated Oct. 27, 2020 issued over the corresponding Japanese Patent Application No. 2019-003437 with the English translation thereof.

*Primary Examiner* — Jonathan Ng
*Assistant Examiner* — James J Triggs
(74) *Attorney, Agent, or Firm* — Carrier Blackman & Associates, P.C.; Joseph P. Carrier; William D. Blackman

(57) ABSTRACT

A vehicle is provided with an interior chamber apart from a passenger compartment, and a container chamber in which a high pressure gas container is accommodated. A heat generating body is accommodated in the interior chamber. Further, in the vehicle, there are formed introduction ports through which atmospheric air is introduced into the interior chamber, a communication passage that enables communication between the interior chamber and the container chamber, and a lead-out port through which the atmospheric air is led out from the container chamber. The atmospheric air that is introduced into the interior chamber through the introduction ports flows into the container chamber via the communication passage, and furthermore, is led out to the exterior of the container chamber from the lead-out port.

7 Claims, 1 Drawing Sheet

(52) U.S. Cl.
CPC ..... *B60K 2001/0438* (2013.01); *F17C 2221/012* (2013.01); *F17C 2270/0178* (2013.01); *F17C 2270/0184* (2013.01)

(56) References Cited

U.S. PATENT DOCUMENTS

| | | | | |
|---|---|---|---|---|
| 2009/0133943 | A1* | 5/2009 | Noguchi | H01M 8/04358 429/421 |
| 2018/0266631 | A1 | 9/2018 | Kanezaki | |

FOREIGN PATENT DOCUMENTS

| | | |
|---|---|---|
| JP | 2007-112333 A | 5/2007 |
| JP | 2007-186200 A | 7/2007 |
| JP | 2009-126452 A | 6/2009 |
| JP | 2018-155335 A | 10/2018 |

\* cited by examiner

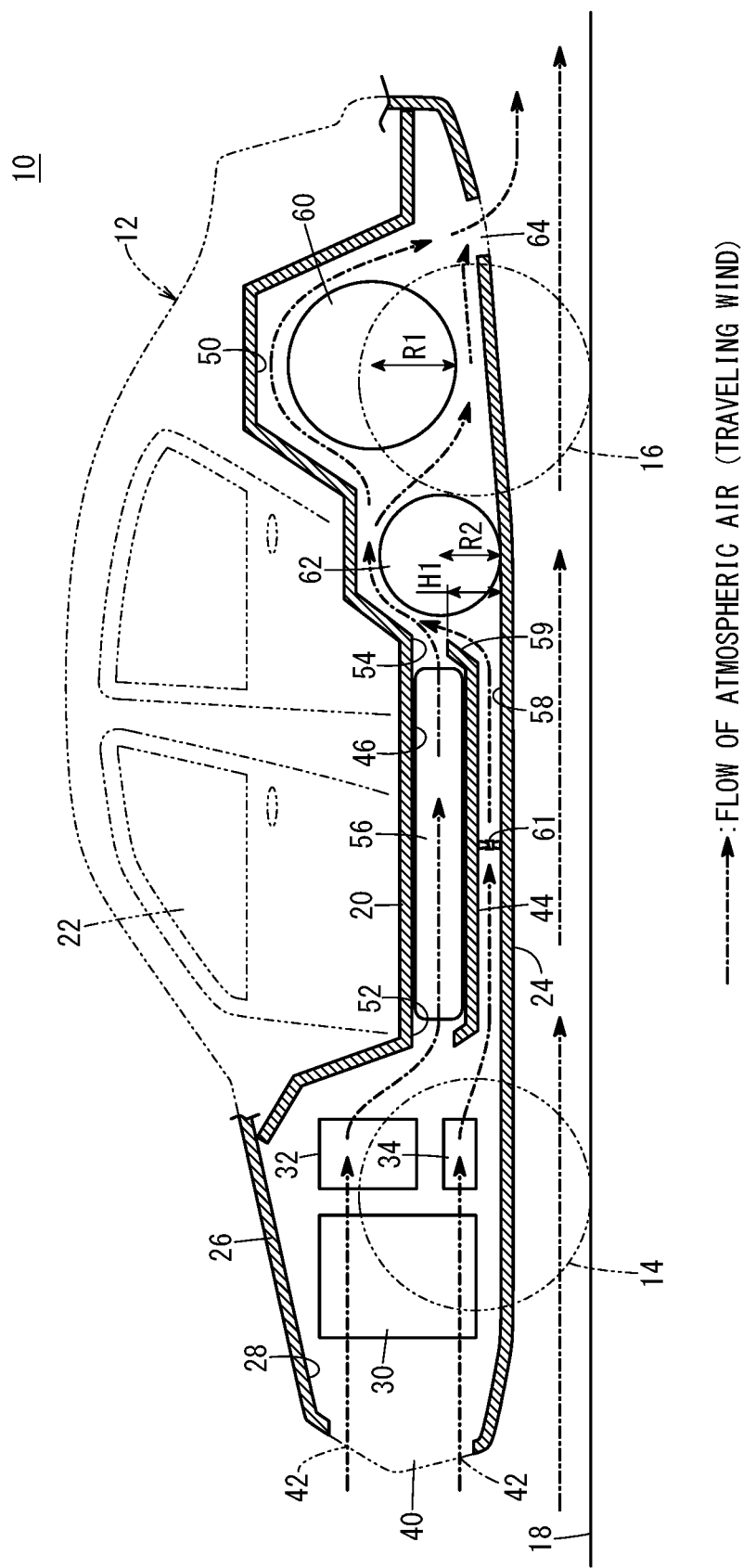

VEHICLE EQUIPPED WITH HIGH PRESSURE GAS CONTAINER

CROSS-REFERENCE TO RELATED APPLICATION

This application is based upon and claims the benefit of priority from Japanese Patent Application No. 2019-003437 filed on Jan. 11, 2019, the contents of which are incorporated herein by reference.

BACKGROUND OF THE INVENTION

Field of the Invention

The present invention relates to a vehicle equipped with a high pressure gas container, in which a container chamber is provided in a vehicle body, and the high pressure gas container storing high pressure gas is accommodated in the container chamber.

Description of the Related Art

A fuel cell vehicle is a vehicle in which a fuel cell and a motor are installed. The motor, which is operated accompanying generation of electrical power in the fuel cell, imparts a rotational driving force to the vehicle wheels. In accordance therewith, the fuel cell vehicle travels. In this instance, the fuel cell vehicle is also equipped with a high pressure gas container in which a hydrogen gas, a hydrocarbon gas, or the like is compressed and stored. The fuel cell generates electrical power by an electrochemical reaction taking place between the hydrogen gas (or hydrogen in the hydrocarbon gas) supplied from the high pressure gas container and oxygen in the atmosphere (air).

When hydrogen gas or the like is led out from the high pressure gas container, the pressure in the high pressure gas container decreases. Further, as can be understood from the equation of state for atmospheric air, the temperature of the high pressure gas container decreases as the pressure decreases. Further, although a seal member is incorporated in the high pressure gas container in order to prevent the hydrogen gas or the like from leaking, because the seal member undergoes shrinkage as the high pressure gas container becomes lower in temperature, there is a concern that the prescribed sealing function cannot be obtained.

In order to avoid such an inconvenience, as disclosed in Japanese Laid-Open Patent Publication No. 2007-112333, it is recalled that relatively high temperature air inside the passenger compartment is supplied to the container chamber (a "gas tank chamber" as referred to in Japanese Laid-Open Patent Publication No. 2007-112333). In accordance with this technique, the atmospheric air inside the passenger compartment is delivered to the container chamber by a fan.

SUMMARY OF THE INVENTION

The aforementioned fan is provided in an opening of a communication passage that communicates with the passenger compartment and the container chamber. However, referring to FIG. 1 of Japanese Laid-Open Patent Publication No. 2007-112333, the opening is formed in a manner so as to enable communication between a lower side of the passenger compartment and an upper side of the container chamber. Due to the fact that hydrogen gas is lighter than air, until the fan starts rotating, it is possible for the hydrogen gas to intrude into the passenger compartment. Further, since wind is generated from the passenger compartment toward the container chamber, there is a concern that a vehicle occupant may experience a sense of discomfort due to sound or a sensation of cold or the like caused by the wind.

A principal object of the present invention is to provide a vehicle equipped with a high pressure gas container, which is capable of ensuring a sealing function of a seal member that is incorporated in a high pressure gas container.

Another object of the present invention is to provide a vehicle equipped with a high pressure gas container, which is capable of avoiding a situation in which a vehicle occupant experiences a sense of discomfort.

According to an embodiment of the present invention, there is provided a vehicle equipped with a high pressure gas container, in which the high pressure gas container having a high pressure gas stored therein is accommodated in a container chamber, wherein:

a heat generating body is accommodated in an interior chamber apart from a passenger compartment in which a vehicle occupant is riding;

an introduction port through which atmospheric air is introduced into the interior chamber, a communication passage configured to enable communication between the interior chamber and the container chamber, and a lead-out port through which the atmospheric air is led out from the container chamber are formed in the vehicle; and air that is introduced into the interior chamber through the introduction port flows sequentially into the interior chamber, the communication passage, and the container chamber, and is led out to the exterior of the container chamber from the lead-out port.

According to the present invention, a rise in temperature occurs by the atmospheric air coming into contact with the heat generating body in the interior chamber, and thereafter, the atmospheric air comes into contact with the high pressure gas container in the container chamber. Since the atmospheric air, for which the rise in temperature has occurred in this manner, comes into contact with the high pressure gas container, a temperature compensation that is effected with respect to the high pressure gas container is carried out. Therefore, a situation is avoided in which the seal member that is incorporated in the high pressure gas container undergoes excessive contraction, and therefore, the sealing function of the seal member is ensured.

In addition, since the atmospheric air flows through the interior chamber apart from the passenger compartment, it is possible to avoid a situation in which gas intrudes into the passenger compartment from the container chamber. Further, since a flow (wind) being generated from the passenger compartment toward the container chamber is avoided, any concern that the vehicle occupant may experience a sense of discomfort due to sound or a sensation of cold or the like is dispensed with.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 1 is a schematic side view of a vehicle equipped with a high pressure gas container according to an embodiment of the present invention.

DESCRIPTION OF THE PREFERRED EMBODIMENTS

Hereinafter, a preferred embodiment of a vehicle equipped with a high pressure gas container according to the present invention will be presented and described in detail with reference to the accompanying drawings. Moreover, hereinafter, the term "frontward" represents the forward moving direction of the vehicle equipped with the high pressure gas container, and the term "rearward" represents the opposite direction. The term "longitudinal direction" is synonymous with a "front-rear direction", and the term "widthwise direction" implies a direction perpendicular to the longitudinal direction.

FIG. 1 is a schematic side view of a vehicle equipped with a high pressure gas container (hereinafter simply referred to as a "vehicle") 10 according to an embodiment of the present invention. The vehicle 10 is a fuel cell four-wheeled vehicle comprising a vehicle body 12, and two front wheels 14 and rear wheels 16 serving as traction wheels that are assembled onto the vehicle body 12. Reference numeral 18 in FIG. 1 represents a road.

A floor panel 20 (floor) is provided in the vehicle body 12. The floor panel 20 forms a concave space that inclines upwardly at the front of the vehicle body 12, while on the other hand, is depressed upwardly at the rear of the vehicle body 12. Further, a roughly central portion in the longitudinal direction of the vehicle body 12 is substantially flat, and a passenger compartment 22 is defined at the flat portion. A driver's seat and a passenger seat are provided respectively on the front right and left sides, and a rear seat is provided in the rear of the passenger compartment 22. It should be noted that none of the respective seats are illustrated.

An undercover 24, which extends from the front end toward the rear end of the vehicle body 12, is arranged downwardly of the floor panel 20. The floor panel 20 and the undercover 24 are separated from each other by a predetermined interval, and therefore, a space is formed between the floor panel 20 and the undercover 24.

In the front of the vehicle body 12, a motor chamber 28 (interior chamber) is formed by a bonnet 26 forwardly of the undercover 24 and the floor panel 20. A motor 30, which is provided with a stator having an electromagnetic coil that is excited accompanying the supply of current thereto, and a rotor having magnets, is accommodated in the motor chamber 28. Since the configuration of the motor 30 is well known, illustration of the stator and the rotor is omitted. The motor 30 is charged with heat by energizing the electromagnetic coil, whereby the temperature thereof rises. Stated otherwise, the motor 30 is one type of heat generating body.

In the motor chamber 28, there is also accommodated a well-known fuel cell stack 32 (fuel cell) and a vehicle air conditioner. Among these components, the fuel cell stack 32 is capable of generating electrical power, and functions as an electrical power supply source that supplies current to the electromagnetic coil to thereby energize the motor 30. At this time, the fuel cell stack 32 is charged with heat, and the temperature thereof rises. On the other hand, the vehicle air conditioner is configured to include a heater 34 for heating the atmosphere. In this manner, the fuel cell stack 32 and the heater 34 are heat generating bodies. More specifically, the motor 30, the fuel cell stack 32, and the heater 34 are accommodated as heat generating bodies inside the motor chamber 28.

A large number of introduction ports 42 are formed in a front grille 40 disposed between the undercover 24 and the bonnet 26. During traveling of the vehicle 10, atmospheric air flows into the motor chamber 28 through the introduction ports 42. At this time, since the vehicle 10 is traveling, the atmospheric air flows therethrough in the form of a traveling wind.

Further, downwardly of the passenger compartment 22, a holder panel 44 is disposed between the undercover 24 and the floor panel 20. In a space between the holder panel 44 and the floor panel 20, a battery chamber 46, which is another internal chamber, is formed. Furthermore, by the undercover 24 and the concave space of the floor panel 20, a container chamber 50 is formed in the vicinity of (in front and above) the rear wheels 16. Among these components, the battery chamber 46 communicates with the motor chamber 28 via an inlet side opening 52, and together therewith, communicates with the container chamber 50 via an outlet side opening 54 as a communication passage. Stated otherwise, the motor chamber 28 and the container chamber 50 communicate with each other via the battery chamber 46.

A high voltage battery 56 (battery) that supplies electrical power to the electrical equipment is accommodated in the battery chamber 46. When discharging of the high voltage battery 56 is carried out, the battery is charged with heat, and the temperature thereof rises. Stated otherwise, the high voltage battery 56 is also a heat generating body.

On the other hand, a space between the undercover 24 and the floor panel 20 serves as a guide passage 58 for the traveling wind. More specifically, the motor chamber 28 and the container chamber 50 communicate with each other via the guide passage 58. As can be understood from this fact, the guide passage 58 serves as a communication passage. Since the rear end of the holder panel 44 is inclined in an upward direction, at the opening of the guide passage 58 on the side of the container chamber 50, a guide wall 59 is provided which is inclined upwardly from a direction parallel to the longitudinal direction of the vehicle body 12.

Inside the guide passage 58, a blower fan 61 is provided in the form of an airflow assist device. The blower fan 61 assists the traveling wind to flow from the motor chamber 28 toward the container chamber 50.

A first high pressure gas container 60 and a second high pressure gas container 62, in which the hydrogen gas that is supplied to the fuel cell stack 32 is stored, are accommodated in the container chamber 50. The second high pressure gas container 62 is a preliminary container, and is set with a diameter and length that are smaller than those of the first high pressure gas container 60. Ultimately, the second high pressure gas container 62 has a smaller capacity than the first high pressure gas container 60. The second high pressure gas container 62 is disposed in front of the two rear wheels 16, whereas the first high pressure gas container 60 is sandwiched between the two rear wheels 16, and is arranged at a position that overlaps with an upper half of the rear wheels 16 as viewed from the side. Accordingly, a clearance is formed between the first high pressure gas container 60 and the second high pressure gas container 62. Further, other clearances are formed between the first high pressure gas container 60 and a ceiling surface of the floor panel 20, as well as between the second high pressure gas container 62 and the ceiling surface of the floor panel 20.

Each of the first high pressure gas container 60 and the second high pressure gas container 62 includes a hollow liner made of resin, a reinforcing layer made from a fiber reinforced resin or the like and which covers the exterior of the liner, and a mouthpiece (joint member) that is exposed from the reinforcing layer and which is attached to an opening formed on the distal end of the liner. A seal member is interposed between the liner and the mouthpiece. Such a configuration is well known as described in Japanese Laid-Open Patent Publication No. 2018-155335 or the like, and therefore, detailed illustration of this feature is omitted. Moreover, a high pressure hydrogen gas is filled inside the liner.

The opening of the guide passage 58 on the side of the container chamber 50 opens more downwardly than an intermediate location in the height dimension of the first high pressure gas container 60 and the second high pressure gas container 62. In this instance, the term "height direction" represents a direction along the vertical direction of the vehicle body 12. Since the first high pressure gas container 60 and the second high pressure gas container 62, which are of substantially cylindrical shapes, are accommodated inside the container chamber 50 in a recumbent posture, the diameters of the first high pressure gas container 60 and the second high pressure gas container 62 are dimensions in the height direction. More specifically, a height H1 of the opening of the guide passage 58 on the side of the container chamber 50 is smaller than the respective radii R1 and R2 of the first high pressure gas container 60 and the second high pressure gas container 62.

A lead-out port 64, which penetrates from an outer surface (lower surface) facing toward the road 18 to an inner surface (upper surface) facing toward the container chamber 50, is formed on the undercover 24. The lead-out port 64 enables communication between the container chamber 50 and the exterior of the vehicle. Since the lead-out port 64 is formed on the undercover 24 at a more downward location than the floor panel 20, the lead-out port 64 opens in facing relation to the road 18 beneath the vehicle body 12.

The vehicle 10 equipped with a high pressure gas container according to the present embodiment is basically configured in the manner described above. Next, functions and effects of the vehicle 10 will be described.

In order to allow the vehicle 10 to travel, initially, hydrogen gas is supplied to the anodes of the fuel cell stack 32 from the first high pressure gas container 60 (or the second high pressure gas container 62 if the remaining capacity of the first high pressure gas container 60 is low), together with compressed air which is a source of atmospheric air being supplied to the cathodes of the fuel cell stack 32. The fuel cell stack 32 generates electrical power by causing predetermined electrochemical reactions to take place at the anodes and the cathodes. The fuel cell stack 32 is charged with heat accompanying the generation of electrical power, and the temperature thereof rises.

A portion of the electrical power obtained by the fuel cell stack 32 generating power is supplied to the motor 30. The supply of electrical power energizes the electromagnetic coil of the stator, and as a result, an electromagnetic force based on an alternating magnetic field is generated in the electromagnetic coil. The rotor rotates on the basis of a repulsive force and an attractive force generated between such an electromagnetic force, and a magnetic force produced by the magnets of the rotor. The rotational driving force of the rotor is converted into a travel driving force for causing the vehicle 10 to travel by rotating the front wheels 14 (or the rear wheels 16).

For example, when the vehicle occupant recognizes that the temperature of the passenger compartment 22 is low and not comfortable, the vehicle occupant activates the vehicle air conditioner in order to increase the temperature inside the passenger compartment 22 by heating. Along therewith, the heater 34 that constitutes the vehicle air conditioner generates heat, and the temperature rises.

Furthermore, the high voltage battery 56 starts discharging in order to supply electrical power to the electrical equipment. Therefore, the high voltage battery 56 is charged with heat and causes a rise in temperature.

When the vehicle 10 starts to travel, the atmospheric air around the periphery of the vehicle 10 becomes a traveling wind relative to the vehicle 10. A portion of the traveling wind flows into the motor chamber 28 from the introduction ports 42 that are formed in the front grille 40. Since the introduction ports 42 are formed in the front grille 40 which is disposed facing forward of the vehicle body 12, the traveling wind easily flows into the motor chamber 28 through the introduction ports 42.

As described above, the motor 30, the fuel cell stack 32, and the heater 34 are accommodated within the motor chamber 28. Accordingly, the traveling wind that has flowed into the motor chamber 28 comes into contact with the motor 30, the fuel cell stack 32, and the heater 34. During such a contact process, heat is transmitted from the motor 30, the fuel cell stack 32, and the heater 34 to the traveling wind. As a result, the temperature of the traveling wind rises.

A portion of the traveling wind flows into the guide passage 58 that serves as the communication passage, and the remaining portion thereof flows into the battery chamber 46. The traveling wind that has flowed into the guide passage 58 receives assistance from the blower fan 61, and easily flows toward the container chamber 50. Thereafter, the traveling wind is led out from the opening on the side of the container chamber 50. At this time, the height H1 of the opening on the side of the container chamber 50 is smaller than the radii R1 and R2 of the first high pressure gas container 60 and the second high pressure gas container 62, and therefore, the traveling wind initially comes into contact with a lower part of the second high pressure gas container 62 and the first high pressure gas container 60.

In the manner described above, the traveling wind becomes relatively high in temperature as heat is transmitted thereto from the motor 30, the fuel cell stack 32, and the heater 34. When the high temperature traveling wind is led out with respect to the low temperature atmospheric air inside the container chamber 50, the high temperature traveling wind rises inside the container chamber 50 on the basis of a difference in density between both the traveling wind and the atmospheric air. At the opening of the guide passage 58 on the side of the container chamber 50, the upwardly inclined guide wall 59 is also provided, which assists the rising of the traveling wind. Therefore, since the traveling wind comes into contact uniformly over the entirety of the second high pressure gas container 62, the second high pressure gas container 62 is sufficiently heated.

The traveling wind that has flowed into the battery chamber 46 via the inlet side opening 52 receives heat from the high voltage battery 56 by coming into contact with the high voltage battery 56. More specifically, the temperature of the traveling wind rises even further. Thereafter, the traveling wind flows into the container chamber 50 via the outlet side opening 54, and comes into contact with the second high pressure gas container 62. Owing to this feature as well, the second high pressure gas container 62 is sufficiently heated.

The traveling wind that has come into contact with the second high pressure gas container 62 flows into the clearance between the second high pressure gas container 62 and the first high pressure gas container 60, and furthermore, flows inwardly between the undercover 24 and the first high pressure gas container 60, or alternatively, between the first high pressure gas container 60 and the floor panel 20. In this instance, the traveling wind also flows between the road 18 and the undercover 24. Due to flowing of the traveling wind, the lower side of the vehicle 10 (exterior to the undercover 24) develops a negative pressure with respect to the interior of the container chamber 50. Accordingly, based on the Venturi effect, the traveling wind inside the container chamber 50 is drawn toward the traveling wind that circulates externally of the vehicle. Therefore, it is made easy for the traveling wind inside the container chamber 50 to descend toward the side of the lead-out port 64.

In addition, the traveling wind that has descended inside the container chamber 50 is discharged to the exterior of the vehicle through the lead-out port 64 that opens in facing relation to the underside of the vehicle body 12. In such a flow through process, the traveling wind uniformly comes into contact with the entirety of the first high pressure gas container 60. Accordingly, the first high pressure gas container 60 is sufficiently heated. In this manner, due to the fact that the lead-out port 64 opens in facing relation to the underside of the vehicle body 12, the traveling wind can be brought into contact across the entirety of the first high pressure gas container 60 and the second high pressure gas container 62.

As can be understood from the above, in the present embodiment, the traveling wind that has undergone a rise in temperature comes into contact with the first high pressure gas container 60 and the second high pressure gas container 62, and consequently, the first high pressure gas container 60 and the second high pressure gas container 62 are heated. In the case of not being heated, when the hydrogen gas is discharged from the first high pressure gas container 60 (or the second high pressure gas container 62), the temperature of the first high pressure gas container 60 (or the second high pressure gas container 62) is lowered. In contrast thereto, according to the present embodiment, since a temperature compensation is performed by the contact of the traveling wind as described above, a situation can be avoided in which the temperature of the first high pressure gas container 60 (or the second high pressure gas container 62) is excessively lowered.

Accordingly, excessive shrinkage of the seal members that are incorporated in the first high pressure gas container 60 and the second high pressure gas container 62 can be avoided. As a result, the seal members exhibit their predetermined sealing functions. Stated otherwise, the sealing functions of the seal members can be sufficiently ensured.

In addition, the traveling wind flows within spaces other than the passenger compartment 22, and specifically, within the motor chamber 28, the guide passage 58, or the battery chamber 46, as well as the container chamber 50, and does not flow through the passenger compartment 22. Therefore, hydrogen gas is prevented from entering into the passenger compartment 22. Further, since wind is generated from the passenger compartment 22 toward the container chamber 50, any concern that the vehicle occupant may experience a sense of discomfort due to sound or a sensation of cold or the like caused by the wind can be dispensed with.

The present invention is not particularly limited to the above-described embodiment, and various modifications can be made thereto within a range that does not deviate from the essence and gist of the present invention.

For example, the traveling wind may be drawn directly into the battery chamber 46 in which the high voltage battery 56 is accommodated, and the traveling wind that has come into contact with the high voltage battery 56 may be made to flow into the container chamber 50.

Further, the traveling wind may be made to flow to the side of the container chamber 50 by natural circulation thereof, without providing the blower fan 61.

What is claimed is:

1. A vehicle equipped with a high pressure gas container, in which a high pressure gas container having a high pressure gas stored therein is accommodated in a container chamber, wherein:
   a heat generating body is accommodated in an interior chamber disposed on a more frontward side of the vehicle body than a passenger compartment in which a vehicle occupant is riding, and the container chamber is disposed in the vicinity of a rear wheel;
   an introduction port through which atmospheric air is introduced into the interior chamber, a communication passage that is disposed below a floor defining the passenger compartment and enables communication between the interior chamber and the container chamber, and a lead-out port through which the atmospheric air is led out from the container chamber, the lead-out port being opened in facing relation to a lower side of the vehicle body;
   the high pressure gas container is accommodated in the container chamber with a clearance formed between an upper end of the high pressure gas container and a ceiling surface of the container chamber in a height direction of the vehicle; and
   the communication passage opens at a location forward of the high pressure gas container and below the upper end of the high pressure gas container;
   whereby air that is introduced into the interior chamber through the introduction port will be brought into contact with the heat generating body to have an increased temperature, the air with the increased temperature will flow from the communication passage to the container chamber, a part of the air with the increased temperature will be caused to flow through the clearance to come into contact with the high pressure gas container, and the air will be led out to the exterior of the container chamber from the lead-out port.

2. The vehicle equipped with a high pressure gas container according to claim 1, wherein:
   the heat generating body includes at least one of a heater constituting a vehicle air conditioning device, a motor and a fuel cell is installed in the vehicle, and the communication passage opens below an intermediate location of the high pressure gas container in a height dimension along a vertical direction of the vehicle body.

3. The vehicle equipped with a high pressure gas container according to claim 2, wherein a guide wall, which is inclined upwardly from a direction parallel to a longitudinal direction of the vehicle body, is provided at an opening on a container chamber side of the communication passage.

4. The vehicle equipped with a high pressure gas container according to claim 2, wherein an undercover is disposed below the floor, and the communication passage is formed between the floor and the undercover.

5. The vehicle equipped with a high pressure gas container according to claim 1, further comprising another interior chamber that is disposed below the passenger compartment and is different from the interior chamber disposed on the more frontward side of the vehicle body than the passenger compartment, wherein a battery serving as the heat generating body is installed in said another interior chamber.

6. The vehicle equipped with a high pressure gas container according to claim 1, further comprising an airflow assist device for causing the atmospheric air in the interior chamber or the communication passage to flow into the container chamber.

7. The vehicle equipped with a high pressure gas container according to claim 1, further comprising another high pressure gas container which is accommodated in the container chamber and another clearance is defined between the high pressure gas containers.

* * * * *